United States Patent [19]

Neft

[11] Patent Number: 4,896,242
[45] Date of Patent: Jan. 23, 1990

[54] DIRECT AC-DC CONVERTER FAULT PROTECTION SYSTEM

[75] Inventor: Charles L. Neft, Murrysville Boro, Pa.

[73] Assignee: Westinghouse Electric Corp., Pittsburgh, Pa.

[21] Appl. No.: 220,705

[22] Filed: Jul. 18, 1988

[51] Int. Cl.4 ............................................. H02H 7/10
[52] U.S. Cl. ........................................ 361/87; 361/18; 363/50
[58] Field of Search ............................ 361/18, 87, 43; 363/50-59, 87, 135, 136, 137, 139, 23

[56] References Cited

U.S. PATENT DOCUMENTS

| | | | |
|---|---|---|---|
| 3,848,175 | 11/1974 | Demarest | 363/54 X |
| 4,208,691 | 6/1980 | Rogowsky | 363/56 X |
| 4,475,150 | 10/1984 | D'Atre et al. | 363/51 |
| 4,490,780 | 12/1984 | Nondahl | 363/87 |
| 4,521,840 | 6/1985 | Hoadley | 363/51 X |
| 4,535,378 | 8/1985 | Endo | 363/57 |
| 4,620,272 | 10/1986 | Fulton et al. | 363/53 |
| 4,672,526 | 6/1987 | Mehnert et al. | 363/87 |
| 4,723,188 | 2/1988 | McMurray | 361/18 |

*Primary Examiner*—William M. Shoop, Jr.
*Assistant Examiner*—A. Jonathan Wysocki
*Attorney, Agent, or Firm*—C. M. Lorin

[57] ABSTRACT

In a direct AC/AC converter, fault protection is performed with a minimal number of fault detecting devices and the rating of such fault detecting devices is reduced while still being able to respond quickly to a fault current. This is achieved by using a current sensor in common to at least all the current lines of one group of switches and by combining the operation of such common current sensor with the operation of one current sensor associated with the related output phase line. In another embodiment, all the current lines connected to a switch, for all the groups of switches, are passed through a common and single current sensor.

9 Claims, 7 Drawing Sheets

DIRECT AC-DC CONVERTER FAULT PROTECTION SYSTEM

BACKGROUND OF THE INVENTION

The present invention relates to direct AC-to-AC converters in general and more particularly to converter systems of the matrix type such as disclosed in U.S. Pat. Nos. 4,642,751; 4,648,022 and 4,697,230. In this type of AC/AC converter, the AC power supply is directly converted into an AC output power supply for a load, through the use of bilateral switches inserted between the respective phases of an AC input source and grouped in relation to a common and corresponding phase line of the AC output. The bilateral switches are thus grouped per output line and controlled for conduction within each group so as to generate the output AC line voltage waveform.

The purpose of the present invention is to provide with such direct AC/AC converter a dependable overcurrent protection while using a reasonable number of current sensors despite the relatively large branching of currents among the several groups of bilateral switches involved.

In the latter regard, the prior art uses a multiplicity of current sensors to protect each semiconductor switches from a fault current, while there is a need to monitor input line currents, output faults and ground fault as well. Thus, it is desirable to use a current sensor which has a rating limited to the peak current to be monitored and is still capable of fault current detection.

Direct AC-AC converters generally require dependable overcurrent protection. This has been achieved at the present time either with an unacceptably large number of current sensors, or detection has been performed under an excessive level of overcurrent. The present invention aims at minimizing the number of current sensors while requiring only an extremely low level of current through the sensor for fault detection.

SUMMARY OF THE INVENTION

The present invention resides in overcurrent protection for an AC/AC converter including a plurality of bilateral switches associated in groups between the input lines and output lines of the converter. The bilateral switches of a group are operatively connected between a corresponding input line and an output line common to the group. According to the present invention, a single current sensor is coupled with the several input lines of one group and another sensor is coupled with the common output line of the group. Any fault current in the group is detected by comparison between the sensed signal of the common bilateral switch current sensor and the sensed signal of the associated output line current sensor.

BRIEF DESCRIPTION OF THE DRAWINGS

FIG. 1A is illustrative of a bilateral switch setting;

DETAILED DESCRIPTION OF THE INVENTION

Figure 1:
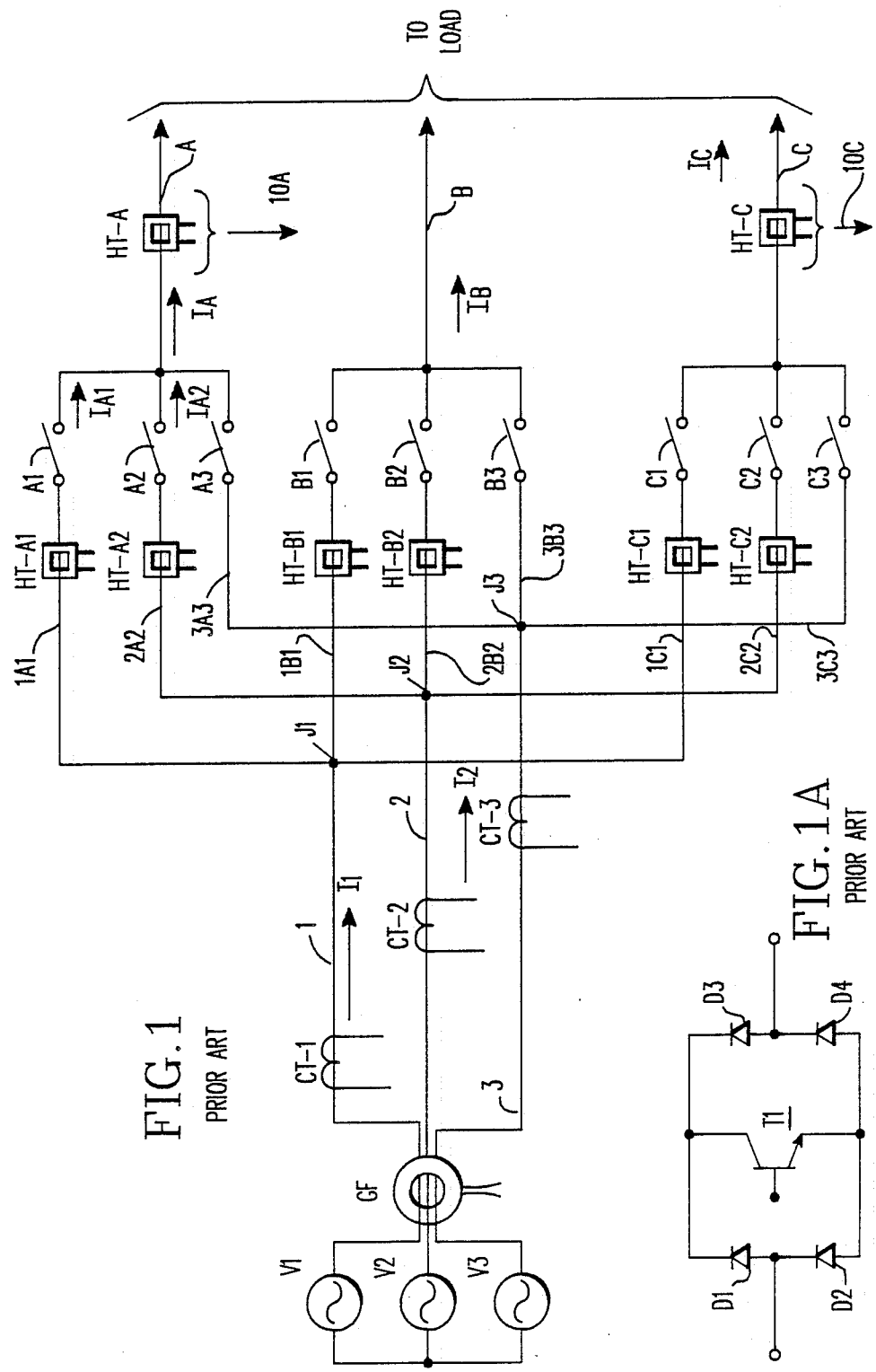
FIG. 1 shows an AC/AC matrix-type converter with current sensors disposed conventionally and added as needed at various locations in order to detect overcurrents and/or faults or a ground in the system.

FIG. 1 shows a matrix-type of AC/AC converter of the prior art. See for instance U.S. Pat. Nos. 4,642,751; 4,648,022 and 4,697,230. Illustratively, the converter includes nine bilateral switches. Three of these switches; namely, A1, A2, and A3, are associated with the three input phases 1, 2, 3 of a power supply of voltages V1, V2 and V3, and with one phase A of the output load. Three switches B1, B2 and B3 are similarly associated with the three input phases, respectively, and with the second output load phase B. The last group of three switches, C1, C2 and C3, interconnects the three input phases to the third output phase C.

FIG. 1A shows a bilateral switch, typically a transistor (although it can be a GTO, a MOSFET, ...), diagonally disposed across a bridge of four diodes D1-D4, as generally known.

Current sensors (generally of the Hall effect type in order to allow DC measurements) are used to detect the current flowing through the bilateral switches and possible overcurrents. Thus, two current sensors HT-A1 and HT-A2 are associated with lines 1A1 and 2A2 which connect with phase A at the output through respective bilateral switches A1 and A2 in group #1. There is no need for a third current sensor since any fault current occurring through the third switch will be sensed by either one of the current sensors associated with the two other switches (HT-A1, HT-A2), or by the output phase current sensor of the group (HT-A). Similarly, there are current sensors in two of the output phases, HT-A and HT-C, for instance. These are required for control purposes independently from any need for protection. However, they are used for that other purpose by detecting output faults. These sensors must be capable of detecting DC currents. With two current sensors per group (HT-B1 and HT-B2 for group #2; HT-C1 and HT-C2 for group #3) for three groups of bilateral switches, plus two current sensors (HT-A and HT-B) for the output phases A and C, the total is eight current sensors in the protection system. This is an alternate approach to monitoring currents at the input line frequency (usually 60 Hz.). This is effected with simple current transformers CT1, CT2 and CT3. Both types of sensors must provide isolation from the mains and also be "fast-acting". An additional sensor GF is required to protect against ground faults.

The object is to protect the AC semiconductor switches against fault currents. These can originate in several ways: 1. output faults, such as caused by short circuiting of the load terminals; 2. ground faults occurring on the load side of the system; and 3. converter faults caused by short circuiting of two main phases through the untimely turning ON of two AC switches tied to the same output phase but inserted in different input phase lines (for example, switches A1 and A2 in FIG. 2). These are usually the most serious types of fault. This is a serious matter because of the high voltage (full line-to-line voltage) available and the low circuit impedance (usually by design in order to obtain optimum converter performance).

Based on the availability of current sensors, such as illustrated by FIG. 1, the circuit is designed so as to allow a fault current to flow, but with the provision that upon such occurrence the bilateral switch (T1 in FIG. 1A) will be safely interrupted. Depending upon various factors, current limiting inductors may, or may not be required for this purpose. In order to take the required step of turning OFF the switch (T1), the presence of a fault current has to be determined. This is done by the current sensors and, upon detection, there will be a command to turn the the switches OFF reliably and safely.

Considering the need for protection and the plurality of current sensors shown in FIG. 1, the prior art from the point of view of protection appears to involve two approaches. The first calls for seven sensors for the converter, including one ground fault detecting device GF and six devices (HT-A1 to HT-C2) having DC sensing capability. The second approach is to use three current transformers (CT1, CT2, CT3), in which case the DC sensing capability is not required. Although this second approach requires less sensors, it raises a difficulty in interpreting the currents which have been measured. This is due to the risk of taking on a common input line for a normal load current what actually is a fault current caused by events occurring on another output phase.

As illustrated in FIG. 1, fault currents $I_{A1}$ and $I_{A2}$ through the A1 and A2 switches are shown as sensed by sensors HT-A1 and HT-A2, respectively. On the other hand are also shown currents I1 and I2 of input phases 1 and 2, as sensed by current transformers CT1 and CT2. Currents $I_A$ amd $I_C$ are also illustrated as sensed by current sensors HT-A and HT-C, respectively. Assuming a peak load of 1.0, the current level at which a fault will have to be identified and for which control action is to be taken will be higher than this level. In order to maximize the utilization of the current device, it is desirable to use such device so that the fault detection level remain as close as possible to the peak current level; 1.5 is assumed to be an acceptable fault detection level. Referring to FIG. 1, in the first row of TABLE I herebelow is given, as an illustration, the normal load condition for a symmetric three-phase system, when the three switches closed at the onset of a fault are A1, B2 and C1. Prior to the fault, the current $I_A$ in phase A being 0, there is a current $I_B$ in phase B of +0.866 and a current $I_C$ in phase C of −0.866. The same currents are found in the input lines: $I_1$ for line 1 (−0.866); $I_2$ for line 2 (+0.866); 0 for $I_3$, $I_{A1}$ and $I_{A2}$. Assuming a fault due to switch A2 closing inadvertently, while the line-to-line voltage V12 (i.e. V1-V2) is positive, a fault current develops and flows from the input line 1 through switch A1 returning via switch A2 to the input line 2. As the current increases, the magnitude of the current through current transformers CT1 and CT2 will initially decrease eventually reaching zero. This occurs because the fault current is of the opposite polarity relative to the normal load current flowing through those two phases. After reaching zero, the magnitude of the current will increase, and so until the fault current ($I_1$ and $I_2$) will have reached the fault level 1.5. As shown in the last row of TABLE I, this will occur when the magnitude of the current flowing through the A1 and A2 switches ($I_{A1}$ and $I_{A2}$) has reached 2.366. This is a much higher value than originally expected. Indeed, the current sensors which are in series with the switches will have detected the fault before such high level be reached.

TABLE I

|  | Switches Closed | $I_A$ | $I_C$ | $I_C$ | $I_1$ | $I_2$ | $I_3$ | $I_{A1}$ | $I_{A2}$ |
|---|---|---|---|---|---|---|---|---|---|
| Prior to Fault | A1 C1 B2 | 0 | +.866 | −.866 | −.866 | +.866 | 0 | 0 | 0 |
| After Fault $I_1$ Reached 0 | A1 C1 [A2] B2 | 0 | +.866 | −.866 | 0 | 0 | 0 | +.866 | −.866 |
| After Fault Trip Level | A1 C1 [A2] B2 | 0 | +.866 | −.866 | 1.5 | −1.5 | 0 | +2.366 | −2.366 |

Figure 2:
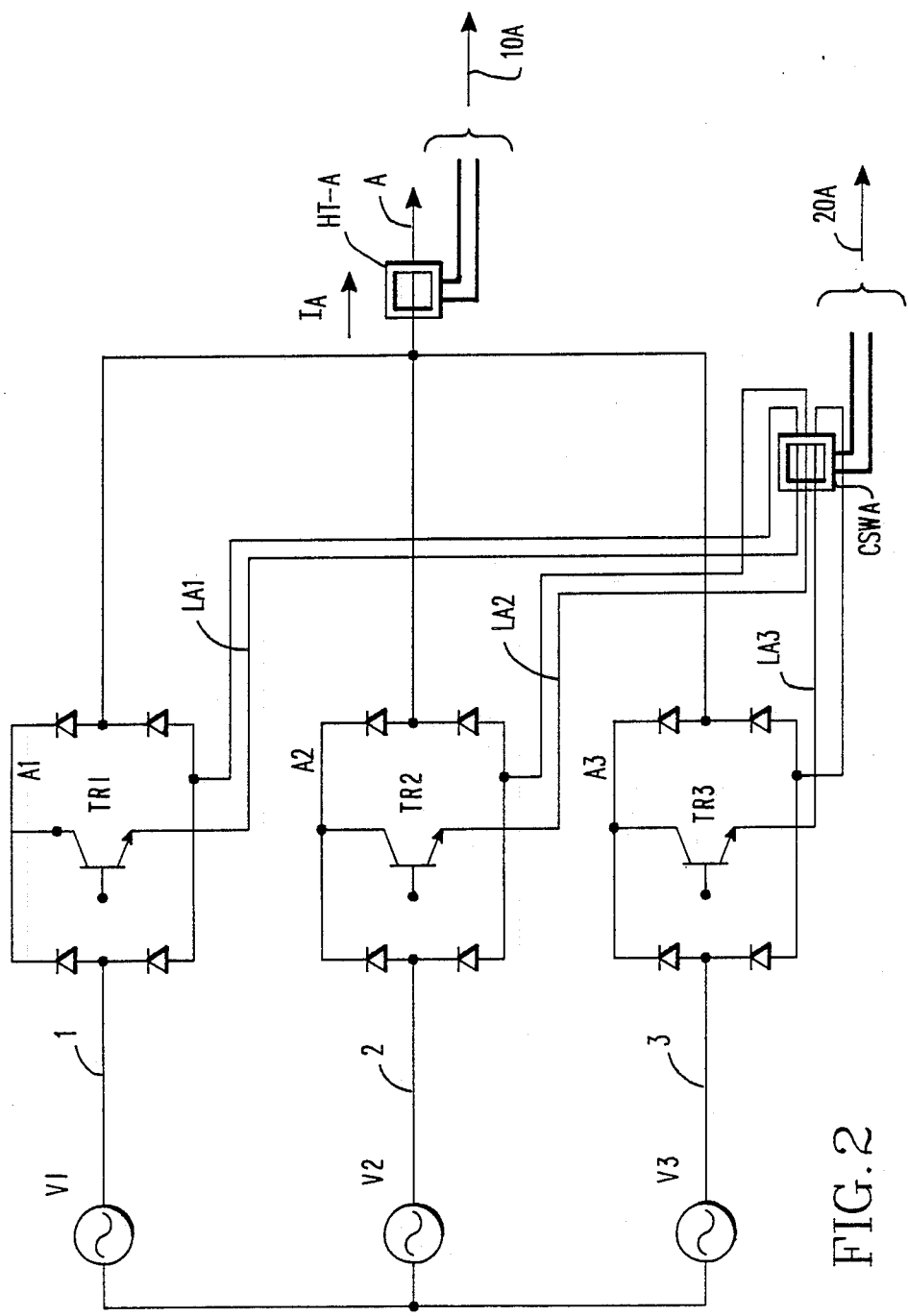
FIG. 2 shows a group of three bilateral switches in the converter system of FIG. 1 using a single and common current sensor according to the present invention.

Referring to FIG. 2, a direct AC to AC converter is shown in which for system protection a particular combination of current sensors is proposed, according to the preferred embodiment of the invention. For the purpose of illustration, the three bilateral switches (A1, A2, and A3) associated with phases 1, 2, 3 at the input, and phase A at the output, are shown with a common current sensor of the Hall effect type CSWA being coupled to the transverse lines LA1, LA2 and LA3 of the central switch TR1, TR2 and TR3 in each bilateral switch. Each line LA1, LA2, LA3 is arranged as a loop passed through the ring of the current sensor CSWA. The output lines (20A) will carry the resulting detection signal requiring actuation by the protection system to trip the switch control system. FIG. 2 also shows the current sensor HT-A, which like in FIG. 1 is affected to the output phase (A in this case). Sensor HT-A also carries at its output (line 10A) a signal representing current $I_A$, which is used together with the signal of line 20A to distinguish between normal current flow and fault current (see TABLE I as an illustration). When there is a fault, the fault current will flow through two transistors (or GTO or other available switch), TR1 and TR2 for A1 and A2 according to the example of TABLE I, in the three-pulse group (first group in FIG. 2). Hence, current will pass through CSWA twice in the same direction. Therefore, the fault current, as seen by the current sensor, will appear as doubled, thereby reducing the threshold for the detection of the fault current. Thus, under the example of TABLE I, the load current $I_A$ through the transistor being 1.0 prior to the onset of a fault, with the common sensor CSWA the threshold for detection of the fault will be 0.75, instead than 1.5. This is less than the peak current of 1.0. The maximum current through the transistor for which the fault can be identified has now become 1.25 (rather than 2.366 according to TABLE I). This will occur when the load current $I_A$ through the transistor is 1.0 prior to the onset of a fault.

Figure 3:
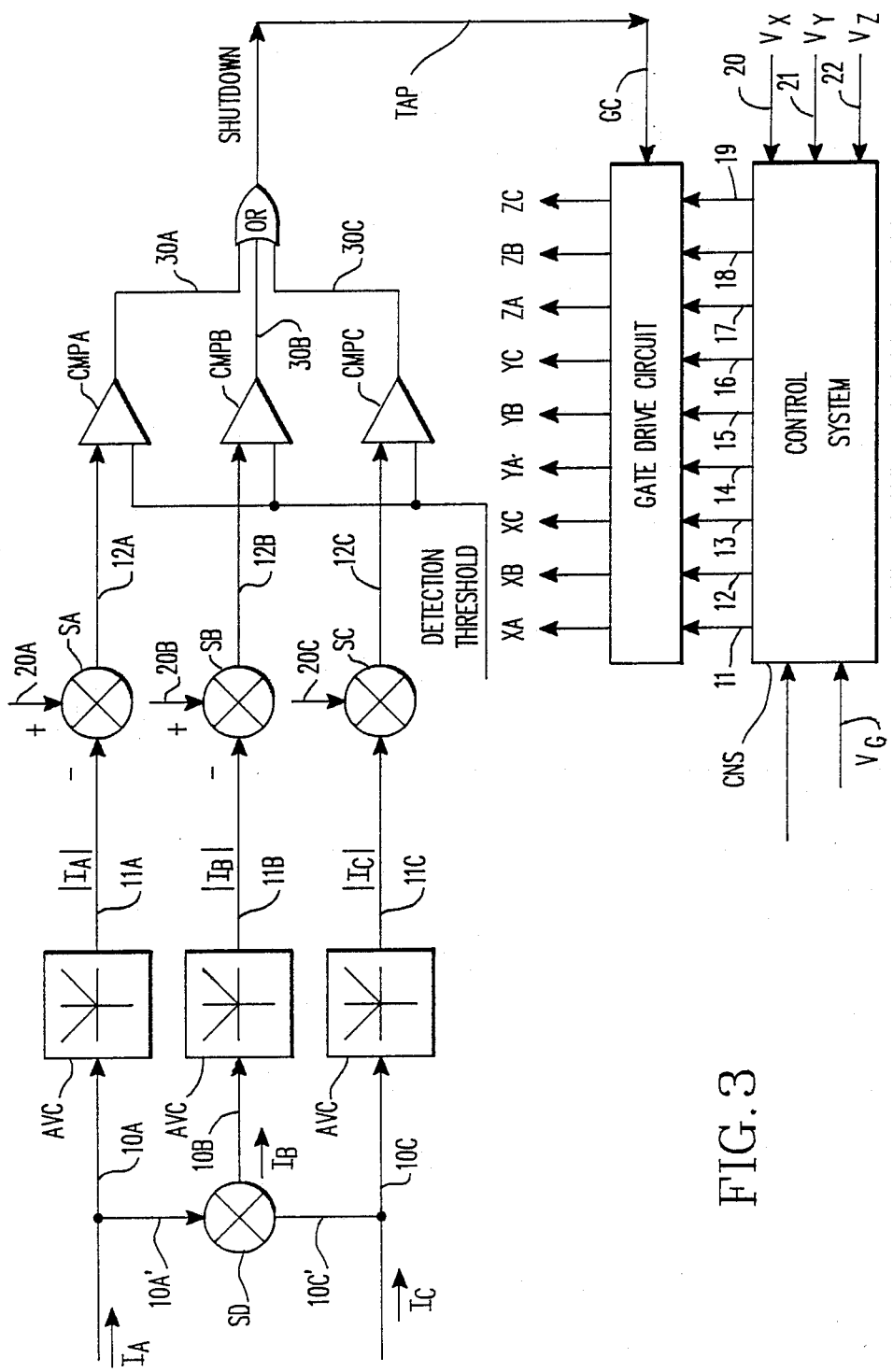
FIG. 3 shows a protection system for an AC/AC converter using the common current sensor of FIG. 2.

FIG. 3 shows the protection system according to one embodiment of the present invention. Line 10A derived as shown in FIG. 2, comes from current sensor HT-A and goes to an absolute value circuit AVC, thus a circuit which responds positively whatever the sense of the current $I_A$ in phase line A at the output. Subtraction from the flow of current sensed within current sensor CSWA is done by passing the signal representing the absolute value $I_A$ (on line 11A) to a subtractor SA which receives at its second input the signal from line 20A, i.e. the current derived from the current sensor CSWA which is common to the associated group of bilateral switches (FIG. 2). The same can be done for the two other groups of bilateral switches (current sensors CSWB and CSWC, not shown).

Since the three currents $I_A$, $I_B$ and $I_C$ add up to zero, a summer SD is used to derive a signal repsentative of IB with HT-A and HT-C without using a third device HT-B. Therefore, lines 10A and 10C from HT-A and HT-C are summed up by lines 10A' and 10C' onto summer SD, thereby outputting on line 10B a signal representative of $I_B$. Three absolute value circuits AVC respond to the respective values on lines 10A, 10B and 10C providing on lines 11A, 11B and 11C the absolute values $I_A$, $I_B$, $I_C$. Normally, the current sensed on the output phase is the same as the magnitude of the current passing through the bilateral switch. Therefore, on the output line (12A, 12B, 12C) of any subtractor (SA for phase A, SB for phase B, SC for phase C) there is a zero magnitude signal. Should however a fault current manifest itself on any of these groups, a comparator (CMPA for phase A, CMPB for phase B and CMPC for phase C) having a threshold value defined on line TH will be set and output (on lines 30A, 30B, 30C, respectively) an alarm signal passed through an OR device as a trip signal for the gate drive circuit of the bilateral switches. The control system and the gate drive circuit have been described as part of a matrix converter in U.S. Pat. No. 4,642,751. For the purpose of describing the control system of the direct AC to AC converter of FIGS. 1 and 2, U.S. Pat. No. 4,642,751 is hereby incorporated by reference. Lines XA, ... ZC correspond to the various bilateral switches A1 to C3 of FIG. 1. When there is a fault, the signal of line TRP will cause the gate circuit to be disabled, thereby turning OFF all the switches, and shut down the system. Referring again to FIG. 2, under normal conditions, except for brief switching underlap intervals, the current through sensor HT-A (the same can be said of HT-B, and HT-C when considering another group of bilateral switches) will have the same magnitude as the current in the corresponding output phase line (($I_A = I_{A1}$).

Figure 4:
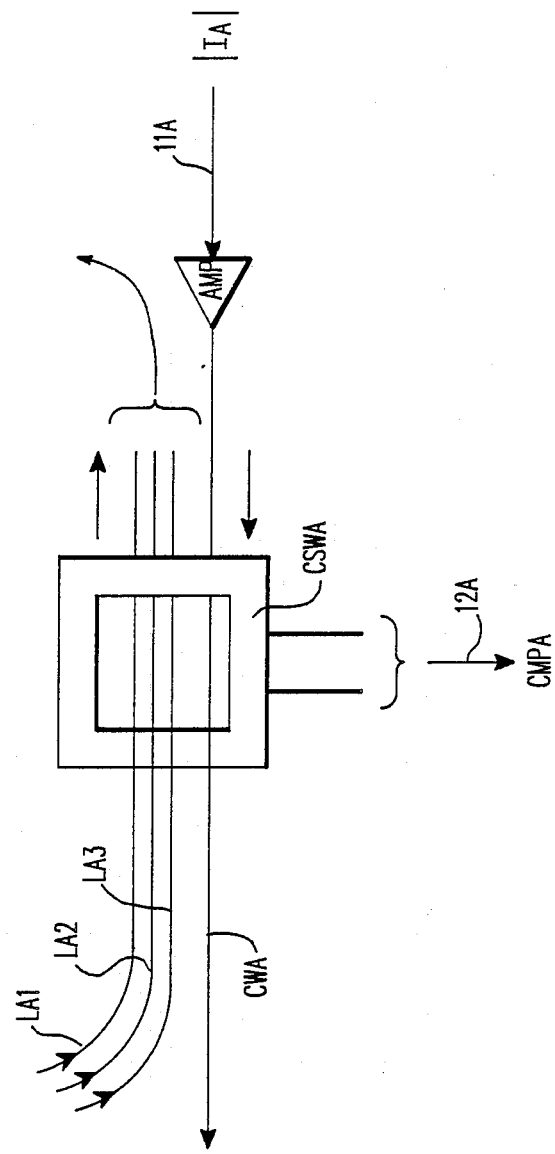
FIG. 4 shows how in the detection of the currents passing through the common single group current sensor compensation for the load current is effected in order to reduce the current sensor rating.

FIG. 4 shows a method of reducing the net current normally flowing in the sensor in order to reduce cost. The rectified value of IA outputted on line 11A is amplified then passed by line CWA through the common current sensor CSWA, thus, together with the loop lines LA1, LA2 and LA3 of the respective bilateral switches of the group (phase line A). The output of the sensor is on line 12A (normally zero). Like in FIG. 3 it goes to comparator CMPA, which will detect whether the threshold has been exceeded and whether tripping is required.

The result of either method of FIG. 3 or FIG. 4, is to produce a measurement that is normally zero regardless of the load current. Under a phase-to-phase fault due to the inadvertent closing of two switches in a three-pulse group, the measurement is twice the fault current. This allows for an extremely rapid identification of a fault condition, independently of pre-existing load conditions. Either method will provide protection for switches with ground fault.

Figure 5:
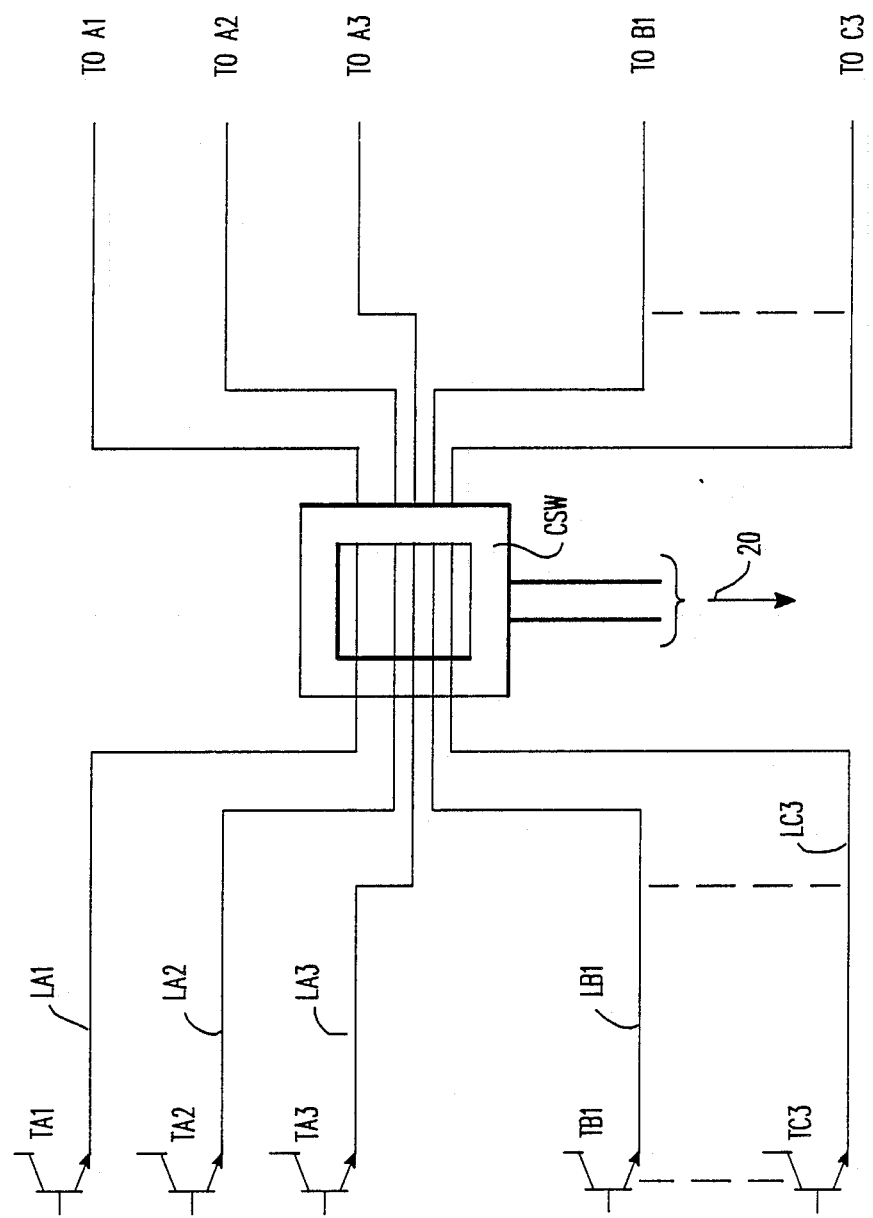
FIG. 5 shows the use of a single current sensor common to all groups of bilateral switches as a further improvement according to the present invention.
Figure 6:
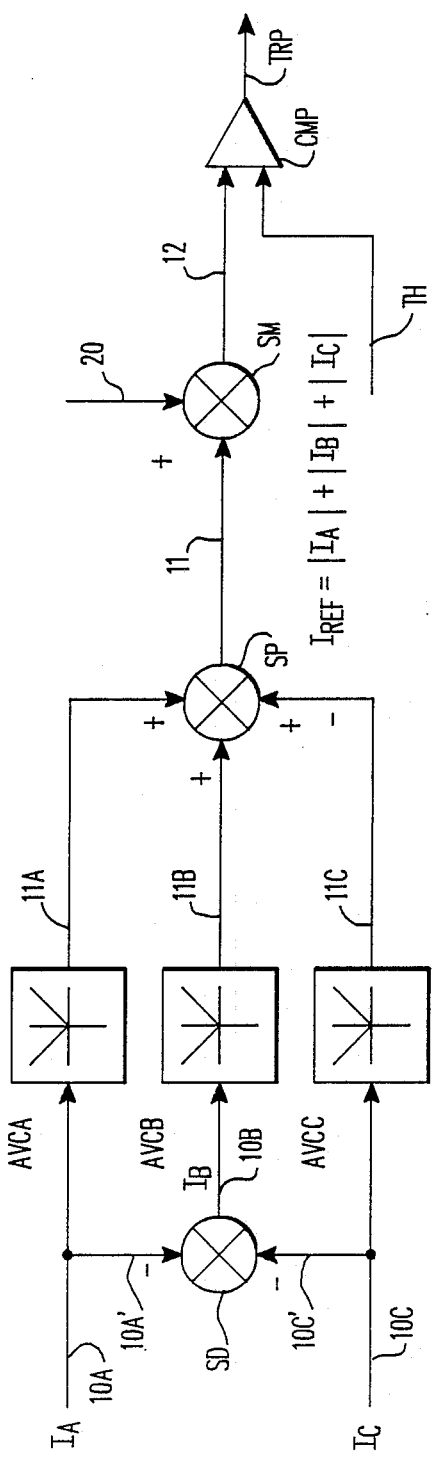
FIG. 6 is illustrative of how in the system of FIG. 5 current detection with the bilateral switch current sensor common to all groups, is compared with the current detection signals of the current sensors of the output lines.

Referring to FIG. 5, another embodiment of the invention is shown wherein a single common current sensor CSW, instead of three CSWA, CSWB and CSWC in the example of FIG. 3. All loop lines LA1, LA2, LA3, LB1, ... LC3 of the various groups are together passed through the common sensor CSW. Also, a single output on line 20 is derived. FIG. 6 shows how in this case according to the method of FIG. 3, the rectified values of the currents $I_A$, $I_B$, $I_C$ for the three output phases are respectively summed-up by a summer SP to form a reference signal IREF on a common line 12 (rather than three lines 12A, 12B and 12C in FIG. 3) as an input to a common subtractor SM also responsive to the signal of the common output line 20 from the common sensor CSW. Line 12 goes to a common comparator CMP responsive to a threshold signal on line TH and outputting on line TRP a command when the threshold is exceeded. Thus, the common sensor CSW monitors the sum of all the transistor currents, which will normally be equal to the sum of the magnitudes of the load currents ($I_{A1}$, $I_{A2}$, $I_{A3}$, $I_{B1}$, ... $I_{C3}$). Through simple electronic circuitry, like with the embodients of FIGS. 3 and 4, the sum of the load currents is obtained through output phase sensors (like HT-A, for FIG. 2) otherwise used for control purpose in the system. Normally, a reference signal so derived and subtracted from the sensed signal will yield a zero value. In the presence of a phase-to-phase fault, though, the fault current will appear doubled through the sensor, and an overcurrent will be rapidly detected. With this approach, only one current sensor has to be used in addition to the output phase line current sensors of the system. This additional current sensor will require a DC sensing capability.

Figure 7:
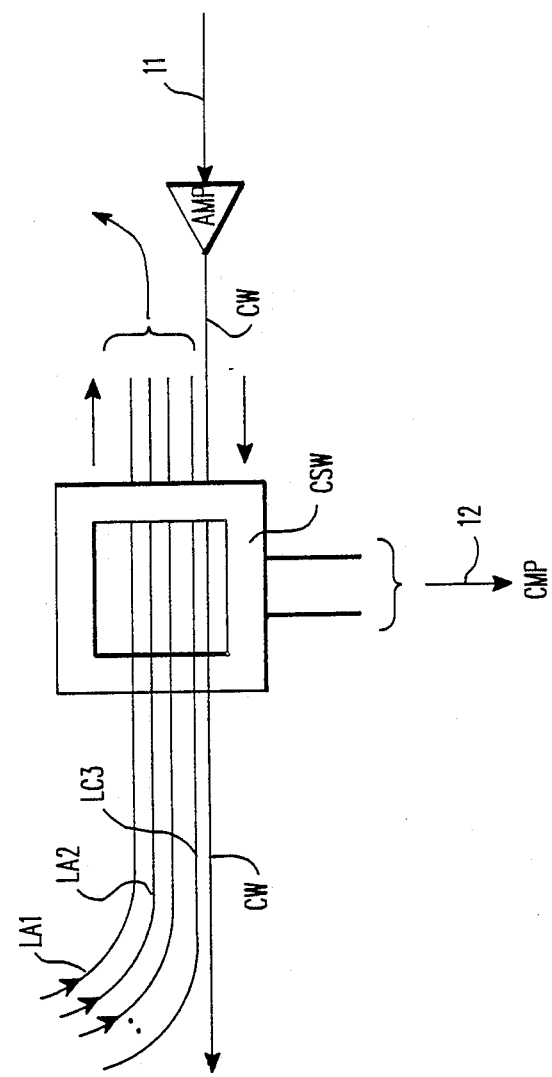
FIG. 7 shows, like in FIG. 4, how load compensation is effected with the single common current sensor according to the present invention.

FIG. 7 shows the second method of nullifying the current normally detected by the current sensor like in FIG. 4. Here, like in FIG. 6, is derived $I_{TA1} + I_{TB-1} + I_{TC1}$ on line 11 which is amplified to provide the matching, nullifying value on line CW under normal load conditions in the system with loop lines LA1, LA2, ... LC3. Like in FIG. 4, such null condition is obtained and used as an input to the comparator CMP of FIG. 5. The purpose of this compensating winding CW is, like in FIG. 4, to reduce the flux levels on the sensor and reduce the cost.

I claim:
1. In a direct AC to AC converter having: a plurality of bilateral switches (BSW) associated in groups between input lines and output lines of the converter, the BSW's of a group being operatively connected each between a corresponding input line and an output line from such group; and control switching means for controlling said BSW's according to a switching pattern wherein said BSW's are concurrently controlled for conduction in groups pertaining to the different input lines and a corresponding common output line; the combination of:

one current sensor operative concurrently in relation to at least the several converter input lines for one group of BSW's whereby a fault current occurring with one BSW will pass to another BSW and said one current sensor will see twice said fault current; and another current sensor operative in relation to the output line from said one group;

means being provided for comparing the outputs of said one and another current sensors for detecting a fault current within said one group.

2. The converter of claim 1 with said one current sensor being common to all the groups of BSW's;

with one said another current sensor being provided for each output line of a group;

with means for summing the outputs of said another sensors to derive a current reference signal representative of a normal balance of currents between the various output lines; and comparator means responsive to said current reference signal and to the output of said common current sensor for detecting a critical current in any of said input lines.

3. The converter of claim 2, with said common current sensor being responsive to all of said converter input lines for one direction of current flow; and with said common current sensor being also responsive to the sum of said group output line currents for the opposite direction of current flow; whereby said common current sensor has a minimal collective response unless there is a fault current.

4. The converter of claim 2 with means responsive to said comparator means for turning OFF said BSW's in response to such critical current being detected.

5. The converter of claim 2 with comparator means responsive to the output of said one current sensor and to the output of said another current sensor for detecting a critical current within said one group.

6. The converter of claim 5 with means responsive to output of said comparator means for turning OFF said BSW's in response to such critical current being detected.

7. The converter of claim 1 with said one current sensor of a group being responsive to said input lines for one direction of current flow; and with said line current sensor being also responsive to the associated common output line for the opposite direction of current flow; whereby said one current sensor has a minimal collective response unless there is a fault current.

8. In an AC/AC converter including nine bilateral switches (BSW) associated by groups of three to the three phase lines of the input power supply, each such group being associated to a corresponding one of the lines at the output, the switching pattern thereof being to concurrently control for conduction three BSW's from three different groups and three different output lines; the combination of:

three current sensors, each of said current sensors being responsive to the currents flowing within a common group and into a corresponding output line; and means associated with at least one of said three current sensors for detecting a critical current therein;

another current sensor being provided for each of said groups and output lines responsive to current flowing therein, said associated means including comparator means responsive to a common group current sensor and to a corresponding another current sensor for detecting such critical current.

9. The converter of claim 8 with means being provided responsive to said critical current level being detected by a corresponding one of said comparator means for turning OFF said bilateral switches.

* * * * *